United States Patent [19]
Brooke

[11] Patent Number: 5,680,789
[45] Date of Patent: Oct. 28, 1997

[54] BEND-ALL

[76] Inventor: Robert Brooke, P.O. Box 696, Spanaway, Wash. 98387

[21] Appl. No.: 700,024

[22] Filed: Aug. 20, 1996

Related U.S. Application Data

[63] Continuation-in-part of Ser. No. 445,220, May 18, 1995, abandoned.

[51] Int. Cl.$^6$ .................................................. B21D 7/00
[52] U.S. Cl. ............................ 72/458; 72/216; 81/176.15
[58] Field of Search ........................... 72/458, 479, 217, 72/216, 218; 81/176.5, 461; 144/123

[56] References Cited

U.S. PATENT DOCUMENTS

| | | | |
|---|---|---|---|
| 3,073,206 | 1/1963 | Rudolph | 81/176.15 |
| 4,061,013 | 12/1977 | Kuc et al. | 72/358 |
| 4,227,429 | 10/1980 | Bowers, Jr. et al. | 81/176.15 |
| 4,237,755 | 12/1980 | Gunnell, III | 81/176.15 |
| 4,291,568 | 9/1981 | Stifano, Jr. | 72/358 |
| 4,304,117 | 12/1981 | Rawson | 72/388 |
| 4,488,424 | 12/1984 | McBride | 72/458 |
| 4,751,840 | 6/1988 | Winsor, Jr. | 72/458 |
| 5,214,985 | 6/1993 | Rinehart | 81/176.15 |

*Primary Examiner*—David Jones
*Attorney, Agent, or Firm*—Thomas W. Secrest

[57] ABSTRACT

There is disclosed a tool for bending wire, electrical cable, tube and rod. The tool comprises a base plate. On the first surface of the base plate there is a socket for receiving the drive stud from a ratchet wrench or there is a recess in the base plate for receiving the drive stud from a ratchet wrench. On the second surface there are two spaced-apart guides. The wire for electrical cable or tube or rod can be placed between the two spaced-apart guides. The tool can be moved and rotated so as to bend the wire, electrical cable, tube or rod to the desired configuration. A guide may have a roughened surface or knurled surface to assist in positioning the wire or rod being worked with the tool.

23 Claims, 8 Drawing Sheets

BEND-ALL

CROSS-REFERENCES TO RELATED PATENT APPLICATIONS (IF ANY)

This patent application is a continuation-in-part of patent application Ser. No. 08/445,220, filing date of 1995 May 18, abandoned.

There is a co-pending design patent application Ser. No. 29/046,765 with a filing date of 1995 Nov. 13.

There was a design patent application Ser. No. 29/039,020 with a filing date of 1995 May 18 which was abandoned.

STATEMENT AS TO RIGHTS TO INVENTIONS MADE UNDER

FEDERALLY SPONSORED RESEARCH AND DEVELOPMENT (IF ANY)

This invention was made with private funds and did not receive any federal funds or federally sponsored research.

BACKGROUND OF THE INVENTION

1. Field of the Invention

The field of the invention is the bending of wire, heavy wire and cable, rod and tube. There are many instances where it is necessary to bend wire, cable, rod and tube. This invention is directed to those instances. A wire, cable, rod, and tube may be considered to be a slender yieldable object whose length dimension is many times greater than its cross-sectional dimension.

2. Description of the Prior Art

The following patents have been called to the attention of the applicant:

| PATENTEE | PATENT NUMBER | ISSUING DATE |
| --- | --- | --- |
| RUDOLPH | 3,073,206 | JANUARY 15, 1963 |
| KUC ET AL | 4,061,013 | DECEMBER 6, 1977 |
| BOWERS, JR. ET AL | 4,227,429 | OCTOBER 14, 1980 |
| GUNNELL, III | 4,237,755 | DECEMBER 9, 1980 |
| STIFANO, JR. | 4,291,568 | SEPTEMBER 29, 1981 |
| RAWSON | 4,304,117 | DECEMBER 8, 1981 |
| MCBRIDE | 4,488,424 | DECEMBER 18, 1984 |
| WINDSOR, JR. | 4,751,840 | JUNE 21, 1988 |
| DISCHLER | 4,890,469 | JANUARY 2, 1990 |
| KALTHOFF | 5,084,935 | FEBRUARY 4, 1992 |
| RINEHART | 5,214,985 | JUNE 1, 1993. |

The applicant's invention differs from Rudolph in that Rudolph has a tool for removing a cap screw. There is an adapter 19 having a polygonal passage 21 in the central part. Also on adaptor 19 there are two prongs or pins 22. These prongs or pins 22 are short and it is questionable if a wire or a rod can be placed between them if they are to be bent as the pins 22 are too short to receive and to position a wire or a rod. Rudolph does not mention the bending of wire or rod or tube.

Kuc teaches of a method for forming forged socket wrenches. The applicant is not interested in forming forged socket wrenches and therefore differs considerably from Kuc.

The applicant differs from Bowers in that Bowers teaches of a spanner socket wrench. There is a partially annular end face 26 on the end of the tubular body 16. On the surface 26, there are two pins of adjustable length. Bowers teaches of a complicated wrench while the applicant teaches of a unitary tool.

The applicant differs from Gunnell in that Gunnell teaches of a pipe flange tool having three pins 14, 16, and 18. The pins are not adapted for bending wire and rod.

Stifano teaches of a process for forming socket wrenches and coiled alloy steel wire stock. The applicant is not interested in forming socket wrenches and differs considerably from Stifano.

Rawson teaches of a bending tool having two long arms and three knobs for use in bending rod-like articles. Rawson comprises moving parts while the applicant's invention does not comprise moving parts and is of a simpler design and construction.

The applicant differs from McBride in that McBride teaches of a bender comprising many parts which have to be assembled in order to bend a wire. McBride teaches of two socket wrenches and handles 50, there is a header plate 64 and a lower plate 70. McBride's device is much more complicated than the applicant's tool.

The applicant differs from Windsor in that Windsor describes a mandrel. In fact, Windsor describes many mandrels of different shapes and different sizes which require a type of handle for rotation. In fact, Windsor has the equivalent of two handles in elements 2 and 26. The applicant does not have the equivalent of two handles and therefore differs from Windsor.

The applicant differs from Dischler. The applicant teaches of a small tool for bending wire and a rod in a cramped or small location such as an electrical box. Dischler teaches of a complicated machine which is not sufficiently small to fit into an electrical box.

The applicant differs from Kalthoff in that Kalthoff is directed to a pair of pliers or an object similar to a pair of pliers for bending wire.

The applicant differs from Rinehart in that Rinehart is directed to removing an oil plug from a barrel or the like. Rinehart is not directed to bending a wire or a rod.

There was submitted with Ser. No. 08/445,220, a catalog of Greenlee Tool/Subsidiary of Textron, Inc., 445 Boeing Drive, Rockford, Ill. 61109 U.S.A;

Catalog #AD-240 of GB Electrical, Inc., 6101 N. Baker Road, P.O. Box 09498, Milwaukee, Wis. 53209;

Catalog 134 of Klein Tools, Inc., 7200 McCormick Blvd., P.O. Box 599033, Chicago, Ill. 60659-9033; and General Catalog 107 of Ideal Industries, Inc., Becker Place, Sycamore, Ill. 60178.

The applicant has reviewed the cited patents and has looked at the catalogs and has not found a disclosure similar to the applicant's invention comprising essentially a coplanar base having two projecting guides on one surface. On the other surface there may be a socket or in the other surface there may be a recess for receiving a socket. The socket or recess can receive a stud for moving the invention in the bending of wire, cable, tube or rod. The applicant has not found such a disclosure in any of the referenced prior art.

SUMMARY OF THE INVENTION

The applicant is an electrician. Part of his work is to install wire, cable composed of many wires and the like into a fuse box or circuit breaker panel or the like. It is necessary to bend heavy wire and electric cable. Electric cable comprises strands of electric wire. It is often difficult to accurately and neatly bend the heavy wire and the electric cable. In a meter base or the like there is generally only a small amount of room in which to work with the wire. Therefore, to bend the wire or cable there is generally required a bending tool. The bending tool prior to this invention was pliers or gripping tools or the like.

From working with heavy wire and cable, the applicant developed the subject invention. The subject invention is small in size and can be held in the palm of the hand of the electrical worker. This small tool can be used inside of a de-energized fuse box, meter base or other electrical boxes and fittings.

There are a number of photographs illustrating the subject invention and use of the subject invention.

The subject invention is also useful for bending a tube. It is possible to bend the tube by working the subject invention on the tube to bend the tube at a right angle or at some other angle.

Further, the subject invention is useful to adjust or modify brackets or fixtures that are supplied with brackets that do not always fit the application at hand. Whereas the inventor of this device was faced with a lighting bracket that would not fit as designed. He was able to modify the manufactured bracket quite efficiently and avoid a long delay in the attaching of lights to a building.

Further, the subject invention is useful for working with a connecting rod. The applicant was installing a motor in an automotive vehicle and accidentally bent a connecting rod. Instead of buying a new connecting rod, the applicant used the subject invention for straightening the damaged connecting rod. This made it possible to eliminate the buying of a new connecting rod and to use the old connecting rod.

OBJECTS AND ADVANTAGES

An object of this invention is to provide a device for working wire, cable, tube or a rod to a desired configuration such as bending the wire, cable, tube or a rod or straightening the wire, cable, tube or rod.

A further object is to provide a device which is easy to use for working wire, cable, tube or rod.

Another object is to provide a small device which can be used in places where there is a minimum of clearance such as an electrical meter base and an electrical fuse box.

An additional object is to provide such a device which is simple in construction and comprises essentially a heavy plate with two guides projecting from one surface and having the ability to receive a drive stud such as from a ratchet wrench.

A further object is to provide such a device which is inexpensive to manufacture.

An additional object is to provide such a device wherein the guides have a recess to assist in receiving wire, cable, tube or rod.

Another object is that this invention provides a variety of bending radius as opposed to existing devices that have a manufactured bending plane that pre-establishes the maximum/minimum radius of a bend.

Another object is that this invention allows the placing of a bend in any direction and in any degree.

Another object is that the invention allows the location of the bend to be at any point along the plane of the material to be bent, whether or not there is access to the ends of the material.

Another object of the invention is that there are available drive studs and drive sockets of many sizes such as ¼-inch, ⅜-inch, ½-inch, ¾-inch, and 1 inch.

A further object is the presentation of a tool having a guide with a roughened surface for restricting the movement of wire, cable, tube or rod while the tool is working on the wire, cable, tube or rod.

The basic design of the tool allows it to be manufactured in various sizes for various sizes of wire and rod.

The tool as used by electricians is such a small size as to be carried in a shirt pocket or in a coat pocket and can be easily stored in a tool box.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

In the drawings, it is seen that

FIGS. 1–4 are directed to a first species of the fabricated invention wherein FIG. 1 is top plan view of the invention and illustrates the base plate, the two guides and a socket for receiving a drive stud;

FIG. 2 is a bottom plan view of the invention and illustrates the base plate and two guides;

FIG. 3 is a side elevational view of the invention and illustrates the base plate, the socket on one surface and the two guides on the other surface;

FIG. 4 is an end elevational view and illustrates the base plate, the socket on one surface and a guide on the other surface;

FIGS. 5–8 are directed to a second species of the fabricated invention wherein FIG. 5 shows the base plate and recess in the base plate for receiving the drive stud;

FIG. 6 is a bottom plan view of the invention and illustrates the base plate, the two guides and the recess for receiving a drive stud;

FIG. 7 is a side elevational view of the invention and illustrates the base plate, the two guides on one surface and the recess for receiving a drive stud;

FIG. 8 is an end elevational view of the invention and illustrates the base plate, a guide and the recess for receiving a drive stud;

FIGS. 12–15 are directed to another species of the tool wherein FIG. 12 is a side elevational view of another species of the invention illustrating a unitary continuous one-piece tool and illustrates the base plate and the two guides;

FIG. 13 is an end elevational view of the tool illustrated in FIG. 12;

FIG. 14 is a top plan view of the tool illustrated in FIG. 12 and shows the base plate, the two guides and the recess in the base plate for receiving a stud; and FIG. 15 is a bottom plan view of the tool of FIG. 12 and illustrates the base plate and the recess in the base plate for receiving a stud.

DESCRIPTION OF THE PREFERRED EMBODIMENT(S)

Figure 1:
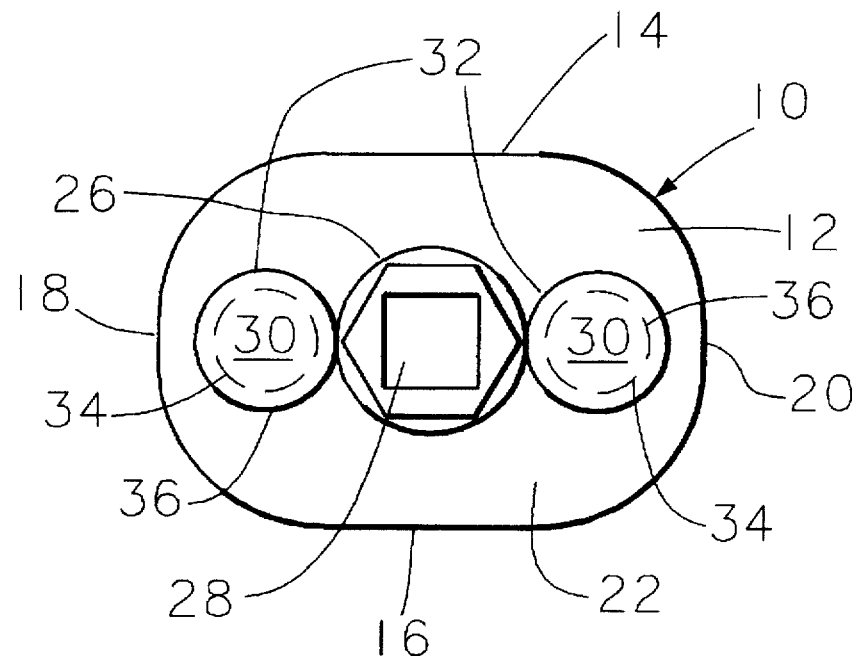
Figure 2:
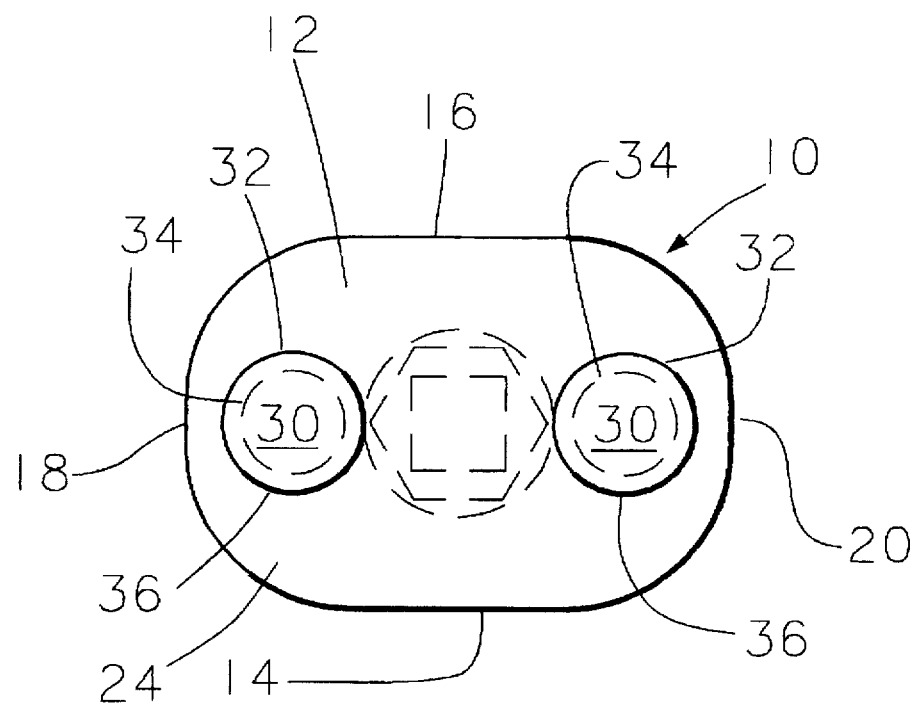
Figure 3:
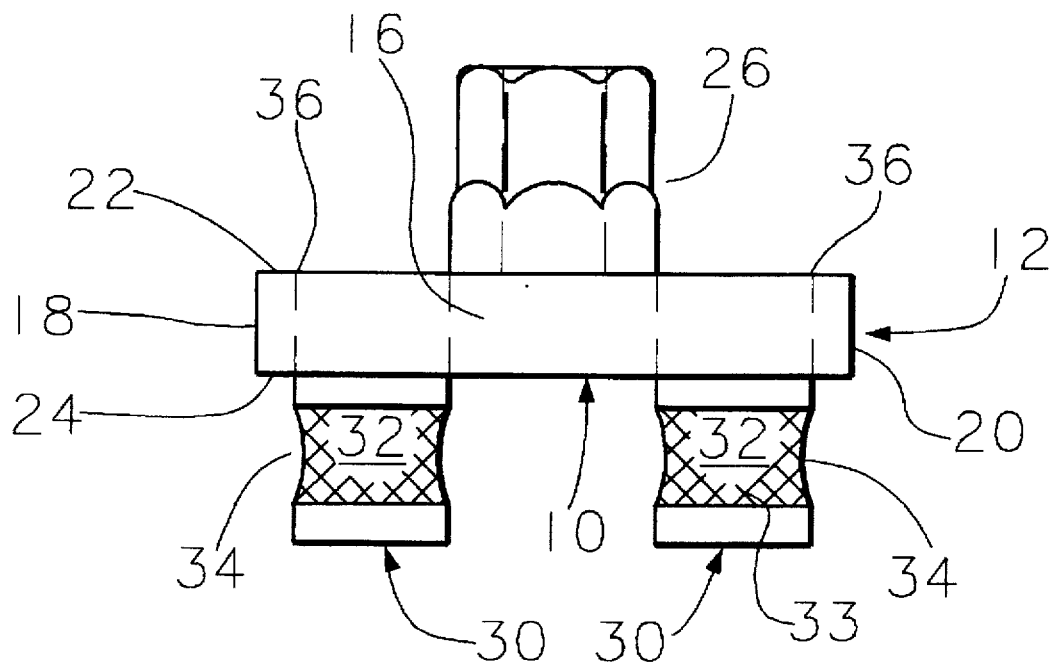
Figure 4:
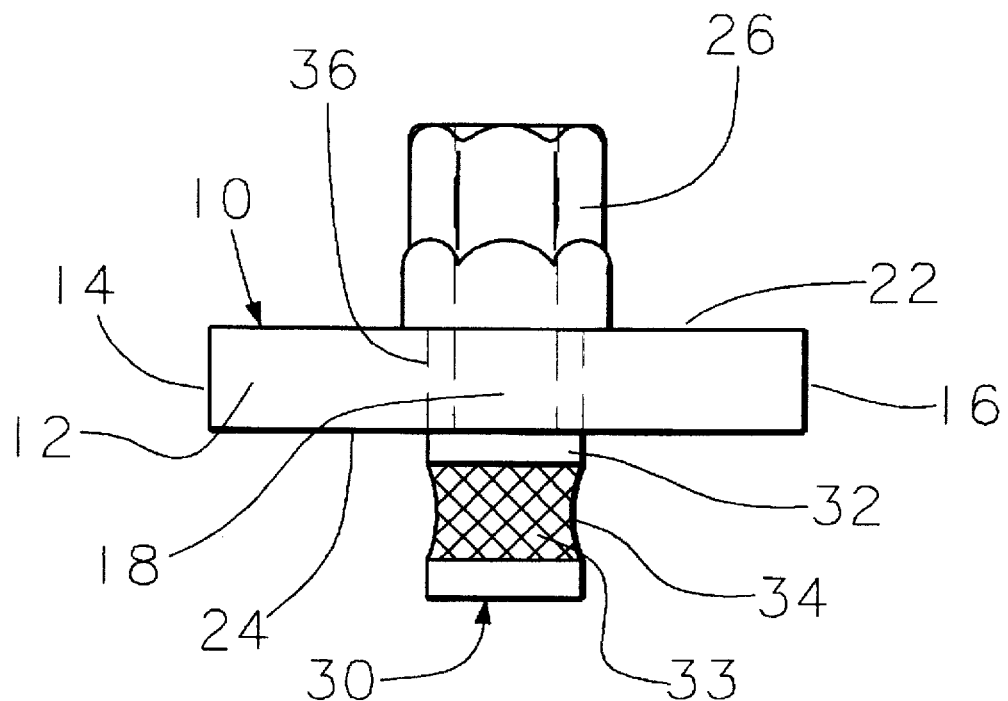
Figure 5:
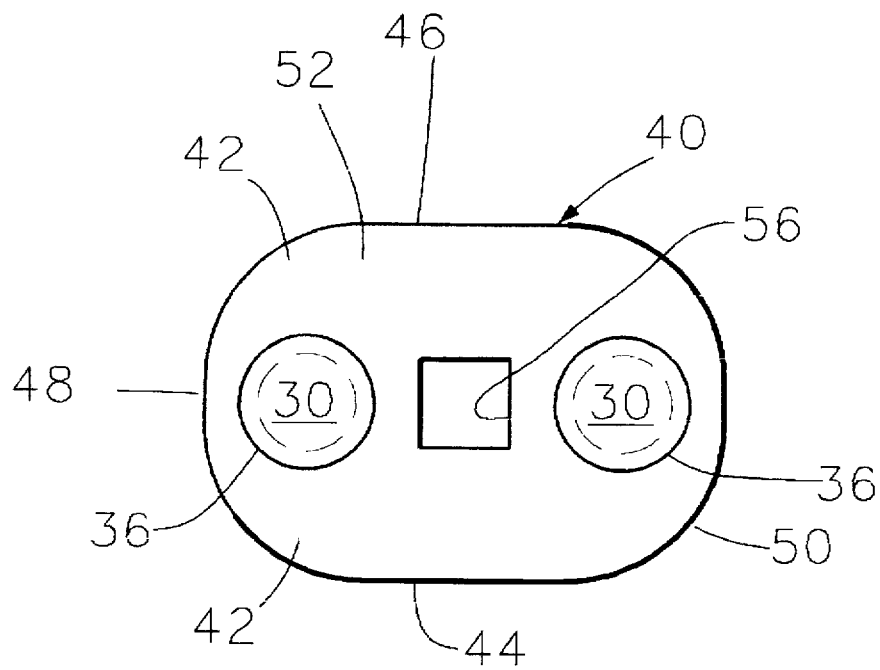
Figure 6:
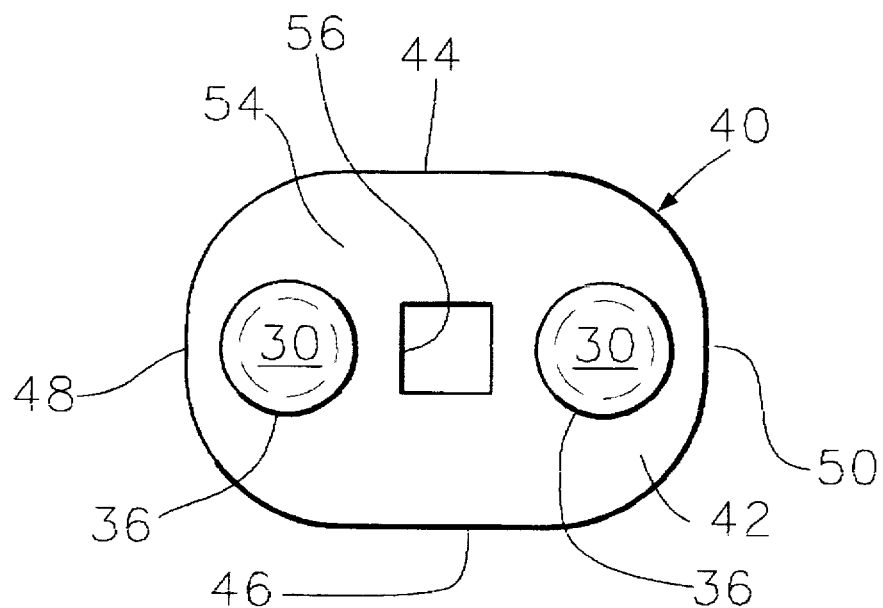
Figure 7:
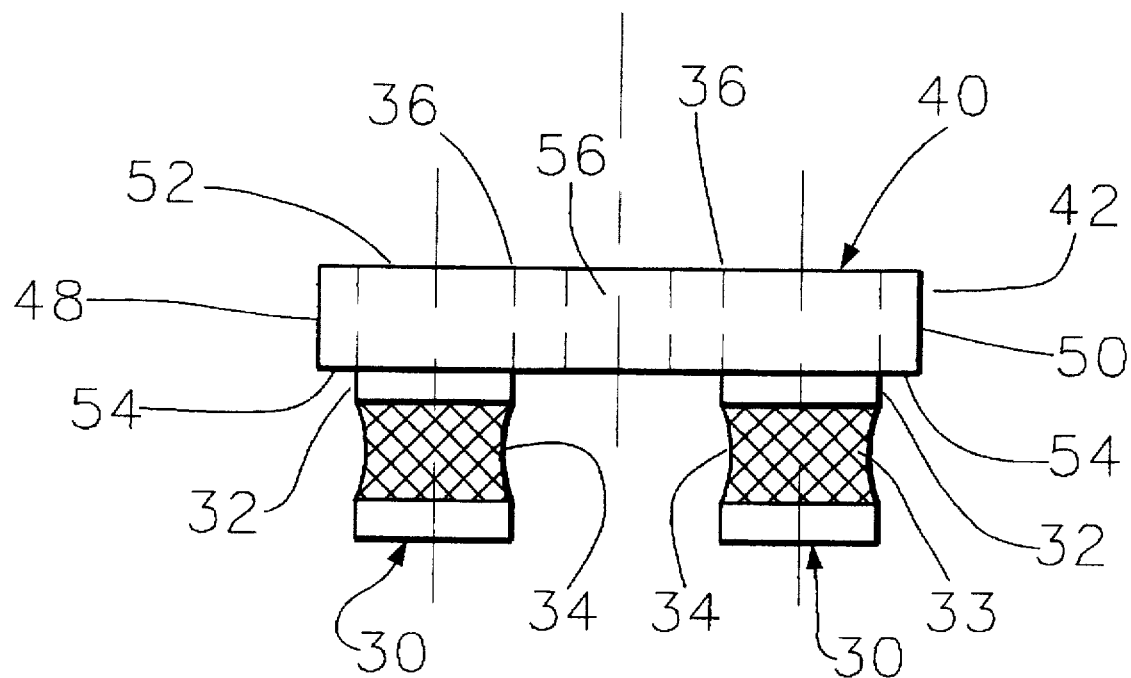
Figure 8:
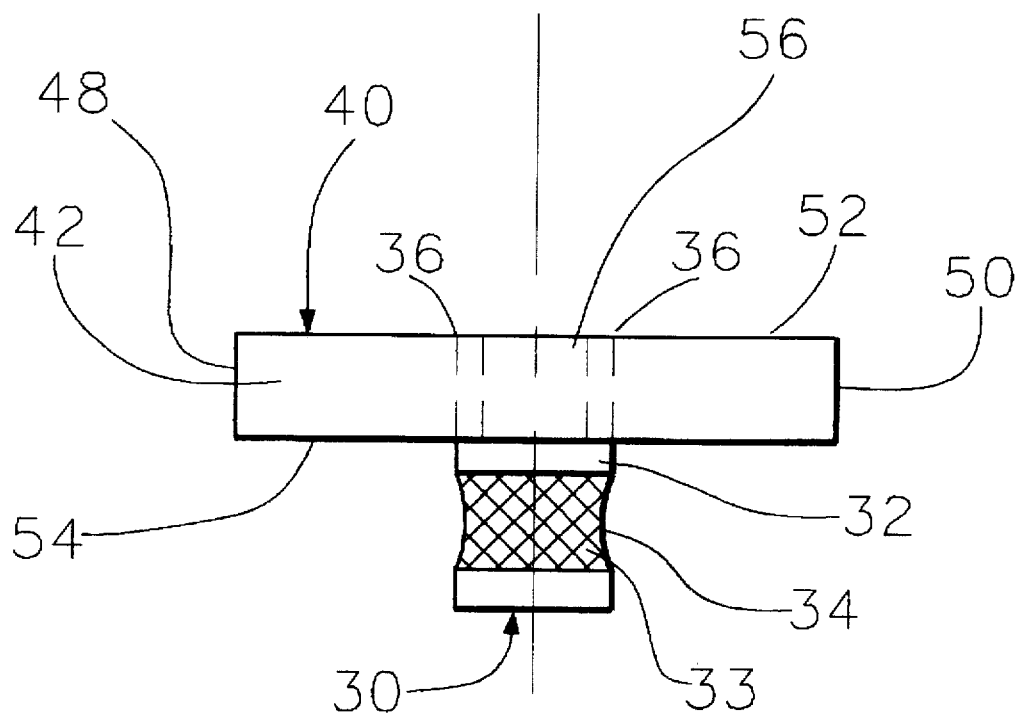

FIGS. 1–4 are directed to one species of the invention and which species is fabricated from many pieces and uses a drive socket for receiving a drive stud.

FIGS. 5–8 are directed to another species of the invention and which species is fabricated from many pieces and has a recess for receiving a drive stud.

FIGS. 12–15 are directed to another species of the invention and the species is a unitary continuous one-piece tool.

In FIGS. 1–4 it is seen that there is a tool 10 comprising a base 12 of a generally rectangular configuration.

The base 12 comprises opposed sides 14 and 16 and curved opposed ends 18 and 20. The sides 14 and 16 are substantially parallel.

The base 12 has an upper surface 22 and a lower surface 24.

From the drawings it is seen that the base 12 is substantially coplanar as it is longer than it is thick. Also, it is wider than it is thick.

There is positioned on the upper surface 22 a socket 26. The socket 26 has a recess 28 for receiving a drive from a drive shaft such as the drive from a ratchet wrench.

On the lower surface 24 there are two spaced-apart guides 30. The guides 30 are, essentially, cylindrical rods 32 having an encircling recess 34.

The surfaces 22 and 24 are substantially parallel.

One method of positioning and attaching the guides 30 to the plate 12 may be a pressure fit. The root of the guide 30 is circular. There may be a circular hole 36 in the base 12. The diameter of the hole may be less than the exterior diameter of the guide 30. The guide 30 may be frozen so as to shrink. The guide 30 can easily be positioned in the hole 36. Upon warming, the guide 30 expands and forcefully contacts the base 12 around the hole. The result is a pressure fit. The guide is firmly positioned in the base 12 and cannot move.

Another method is to have the diameter of the guide 30 of a smaller diameter than the hole 36. The guide 30 can be welded into the hole 36 for definite positioning of the guide on the plate 12.

The encircling recess 34 may have a roughened surface 33 such as a knurled surface. The roughened surface lessens the possibility of slippage or movement of the wire or rod on the guide as the wire or rod is being worked.

The drawings are the same size and dimensions as the tool 10.

In FIGS. 5–8 there is a tool 40 comprising a base plate 42.

The base plate 42 is of a generally rectangular configuration having opposed sides 44 and 46 and curved opposed ends 48 and 50. The sides 44 and 46 are substantially parallel.

The base plate 42 has an upper surface 52 and a lower surface 54.

The surfaces 52 and 54 are substantially parallel.

From the drawings it is seen that the base 42 is substantially coplanar as it is longer than it is thick. Also, it is wider than it is thick.

In the base plate 42 there is a recess 56 for receiving a drive stud such as a drive stud from a ratchet wrench.

On the lower surface there are two spaced-apart guides 30. The guides have been described with respect to FIGS. 1–4 and the description will not be repeated.

The positioning of the guide in the base 42 can be accomplished as stated for positioning the guide 30 in the base 12 and will not be repeated.

From the foregoing, it is seen that there has been provided a tool 10 or 40 for bending or working a long slender yieldable object whose length dimension is many times greater than its cross-sectional dimension such as electrical wire and electrical cable inside of a fuse box or inside of a meter base. There is used a ratchet wrench for rotating or moving the tool 10 or tool 40. Most people working with machinery and mechanical devices have ratchet wrenches. In the United States the common sizes for a ratchet wrench are ⅜-inch, ½-inch, ¾-inch and one inch. Also, there are ratchet wrenches for metric-sized tools.

The electrical wire or electrical cable can be placed between the two guides 30 and in the encircling recess 34 in each guide. The cable or wire is in contact with each guide. Then, the ratchet wrench can be placed in the socket 26 or recess 26. The tool 10 or 40 can be rotated so as to bend the electrical wire or the electrical cable as desired.

The tool 10 or 40 can be used to bend the electrical wire or cable outside of the fuse box or meter base.

However, the tool 10 or tool 40 is of such a size that it can placed inside of the fuse box or meter base so as to bend the electrical wire or electrical cable inside of the fuse box or meter base.

A distinct advantage of this invention is the fact that it can easily be placed on or easily removed from said wire or rod at any place on the wire or rod. Some wire bending pieces of equipment require the equipment to be slipped over the end of the wire and moved to the desired position on the wire. The removal of the equipment from the wire may be difficult and time consuming and frustrating. In extreme cases it is impossible to remove the equipment from the wire.

The size of the socket 26 and recess 56 will vary with the size of the ratchet wrench. This may necessitate the tool 10 or 40 being made in various sizes.

The encircling recess 34 on the guide 30 may have a roughened surface or knurled surface 34. The roughened surface lessens the possibility of movement of the wire with respect to the tool as the wire is being worked.

Figure 9:
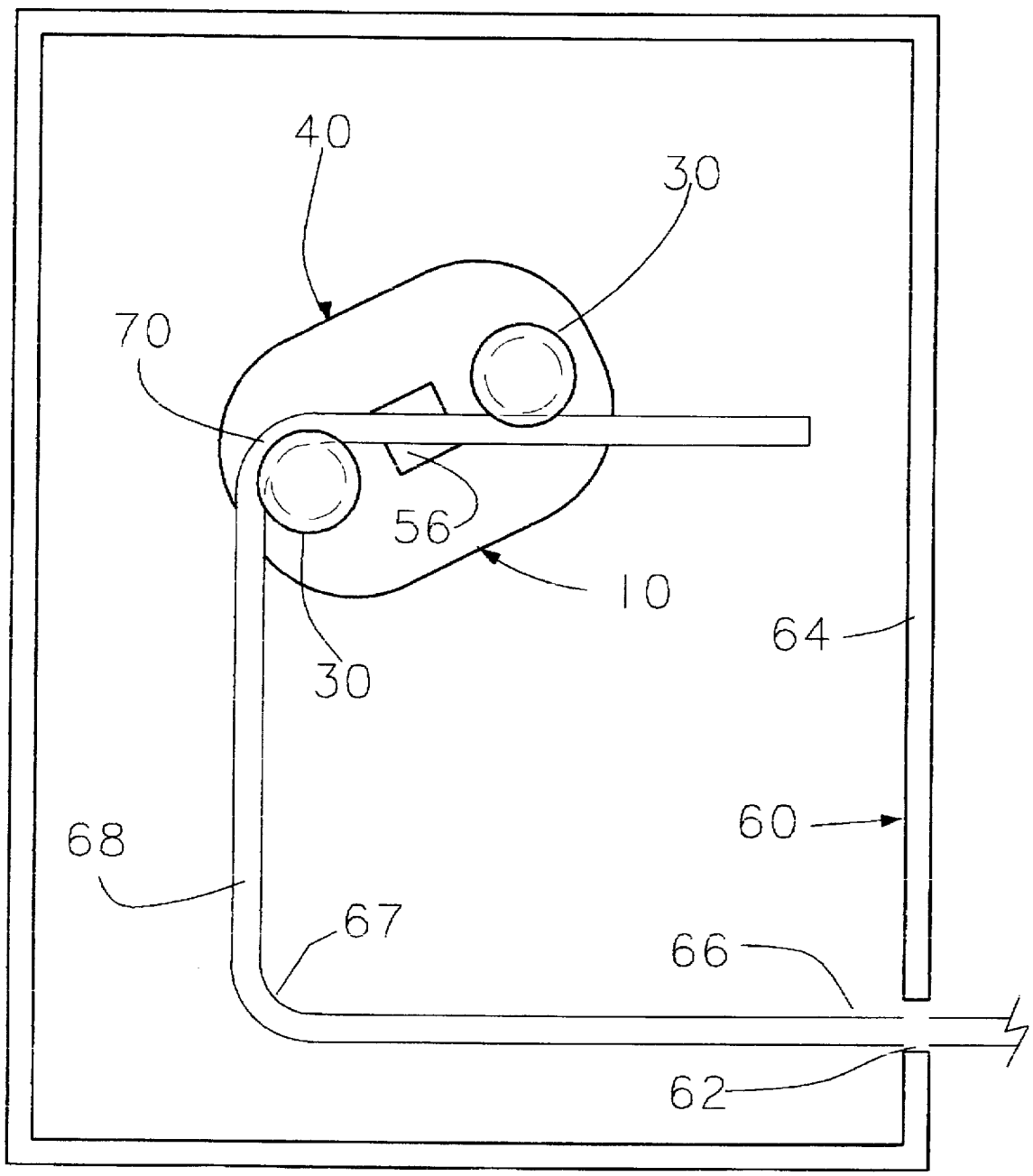
FIG. 9 is an elevational view of an electrical box and a wire wherein the invention and the wire are in the electrical box and the wire is being bent in the box.

In FIG. 9 there is a schematic illustration of an electrical box 60 having an opening 62 in a side wall 64. A wire 66 is in the opening 62. A curve 67 has been made in the wire 66. The curve 67 leads into the straight section 68. The tool 10 is positioned on the wire 66 with the wire 66 between the guides 30 and contacting the guides 30 and in the encircling recesses 34. A curve 70 has been formed in the wire 66 with the aid of the tool 10. It is to be understood that a ratchet wrench or a drive wrench is operatively connecting with the recess 56 in the tool 10 for manipulating the tool 10 and for forming the wire 66 to the desired configuration.

Figure 10:
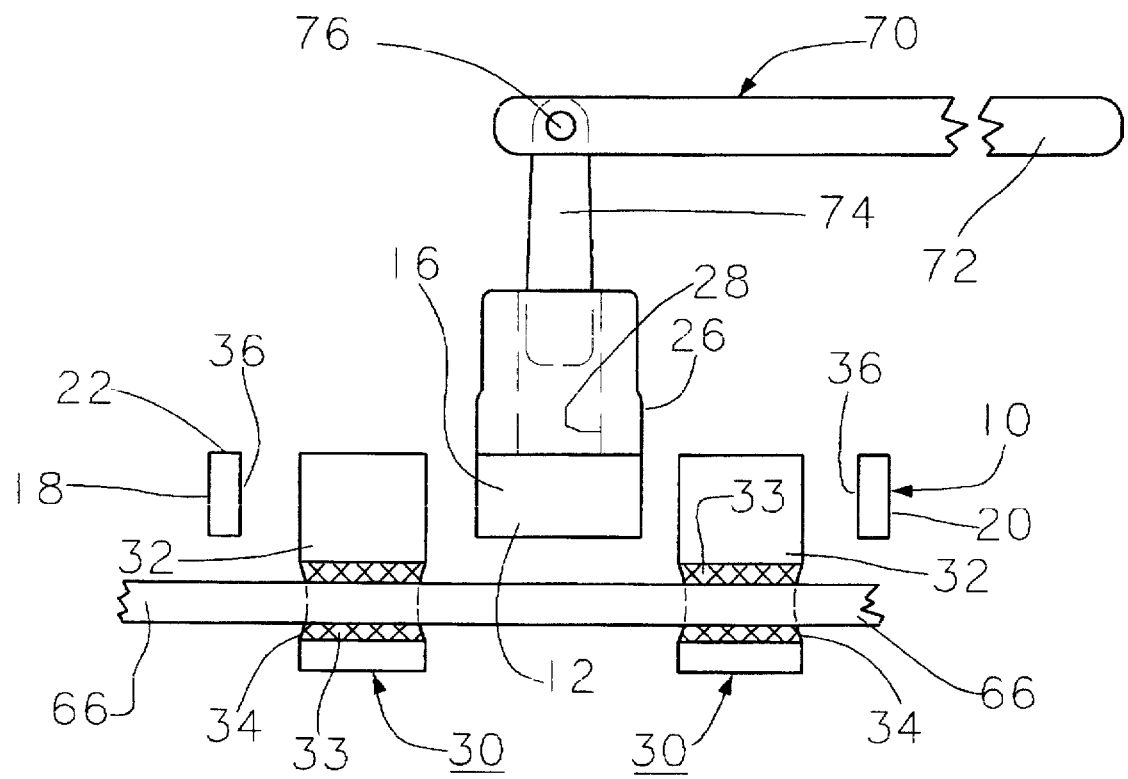
FIG. 10 is a side elevational view of one species of the tool in combination with a drive stud and a handle and a wire positioned near the guides.

In FIG. 10 there is a side elevational view of a tool 10, wire 66 and a drive stud tool 70.

Figure 11:
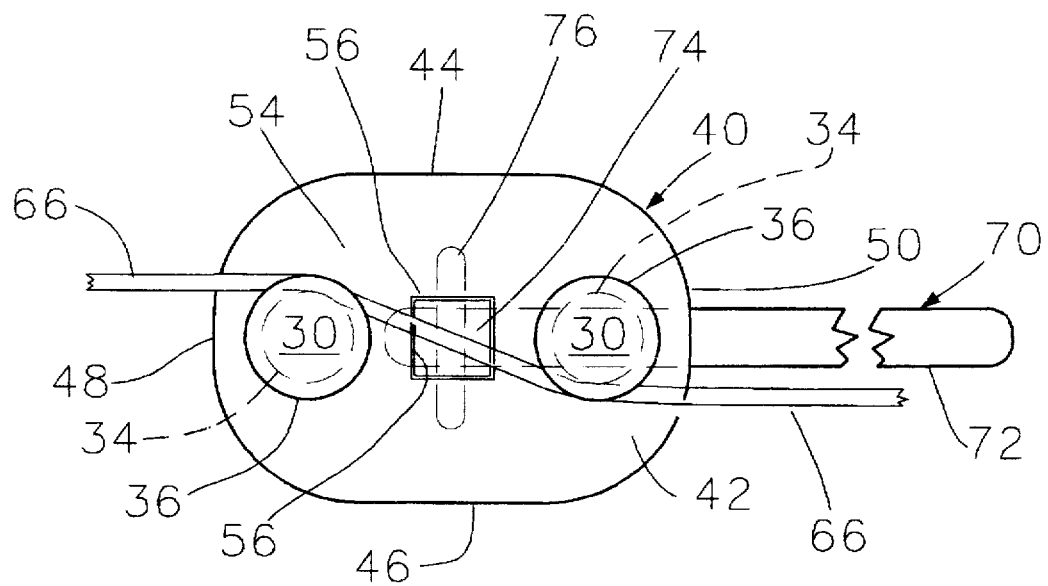
FIG. 11 is a bottom plan view of another species of the tool in combination with a drive stud and a handle and a wire positioned near the guides.

In FIG. 11 there is a bottom plan view of a tool 40, a wire 66 and a drive stud handle 70.

With reference to FIG. 10 it is seen that the drive stud tool 70 has a handle 72, a drive stud 74 and a pin 76 connecting together the handle 72 and the drive stud 74. This makes it possible for the drive stud 74 and the handle 72 to rotate with respect to each other.

The wire 66 is positioned so that it is in front of the left guide 30 and behind the right guide 30 which has a roughened or knurled surface 33. The person operating the drive stud tool 70 can rotate the handle 72 away from the observer so as to form a bend in the wire 66.

It is seen that the drive stud 74 is positioned in the recess 28 in the socket 26.

In FIG. 11, the tool 10 has been replaced by a tool 40. The tool 40 does not comprise a socket 26 but comprises a recess 56 for receiving the drive stud 74. The recess 56, in FIG. 11, appears to be a square or in the configuration of a square. The recess 56 or the square 56 is a receptacle for the drive stud 74 or receives the drive stud 74. As illustrated in FIG. 11, it is possible for the operator to rotate the drive stud tool 70 in a clockwise manner so as to bend the wire 76. In FIG. 11, it is seen that the wire 76 is positioned above the left guide 30 and is positioned below the right guide 30. The wire 76 is in the recessed part 34 of each guide 30 and is in contact with each guide 30. With the rotation of the drive stud tool 70 in a clockwise manner there is formed a bend in the wire 76.

Further, from FIGS. 10 and 11 it is seen that the recesses 34 assist in positioning the wire on the guides 30. This makes it easier to place a bend in the wire 30.

In FIG. 10 it is seen that there is used a drive socket 26 for receiving the drive stud 74.

In FIG. 11 it is seen that there is used a recess 56 for receiving the drive stud 74.

The use of a tool 10 or the use of a tool 40 becomes one of personal preference by the electrician.

In FIGS. 12–15, there is illustrated another species of the tool 80 having a base 81.

It is seen that in a plan view the tool 80 is of a generally rectangular configuration having opposed sides 82 and 84 joined by ends 86 and 88. The sides 82 and 84 are substantially parallel.

The tool 80 has an upper surface 90 and a lower surface 92. The surfaces 90 and 92 are substantially parallel.

From the drawings it is seen that the base 81 is substantially coplanar as it is longer than it is thick. Also, it is wider than it is thick.

It is seen that in the tool 80 there is a recess 94 of a square configuration. This recess 94 is for receiving a stud of a ratchet wrench or a drive stud.

Projecting outwardly from the lower surface 92 are two spaced-apart guides 96. The guides 96 are of a cylindrical configuration having a recess 98. The recess 98 makes it easier to position and to maintain the position of a wire or a rod being worked. On one or both of the guides 96 and in the recess area 98, there may be a roughened surface 100 or a knurled surface 100 to assist in maintaining the position of the wire or the rod with respect to the tool 80.

Figure 12:
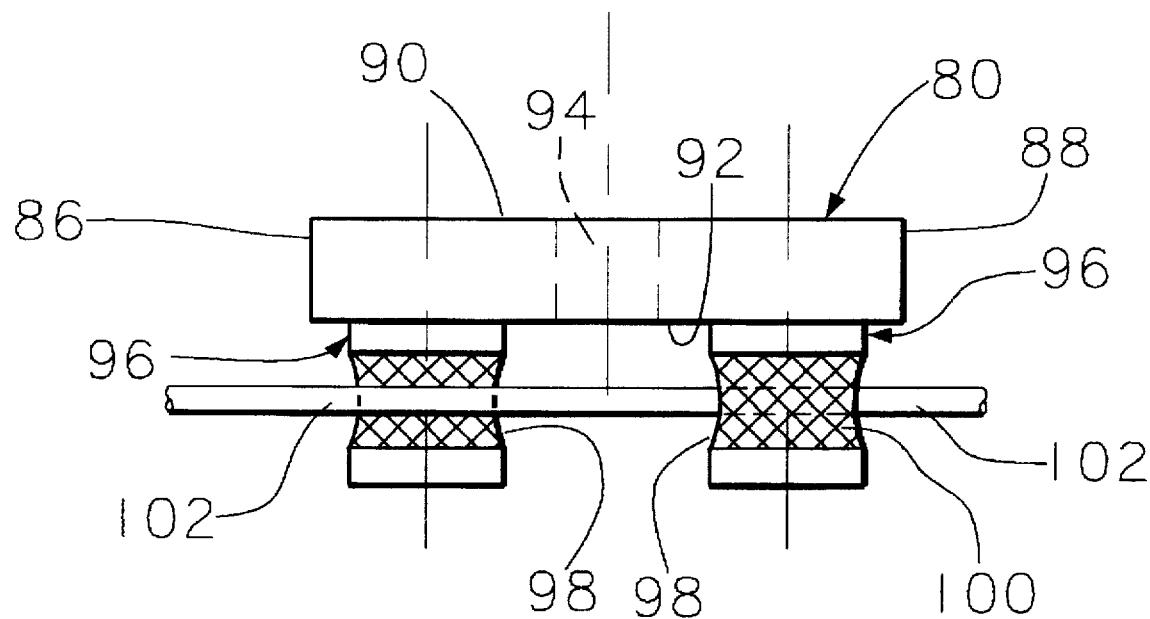
Figure 13:
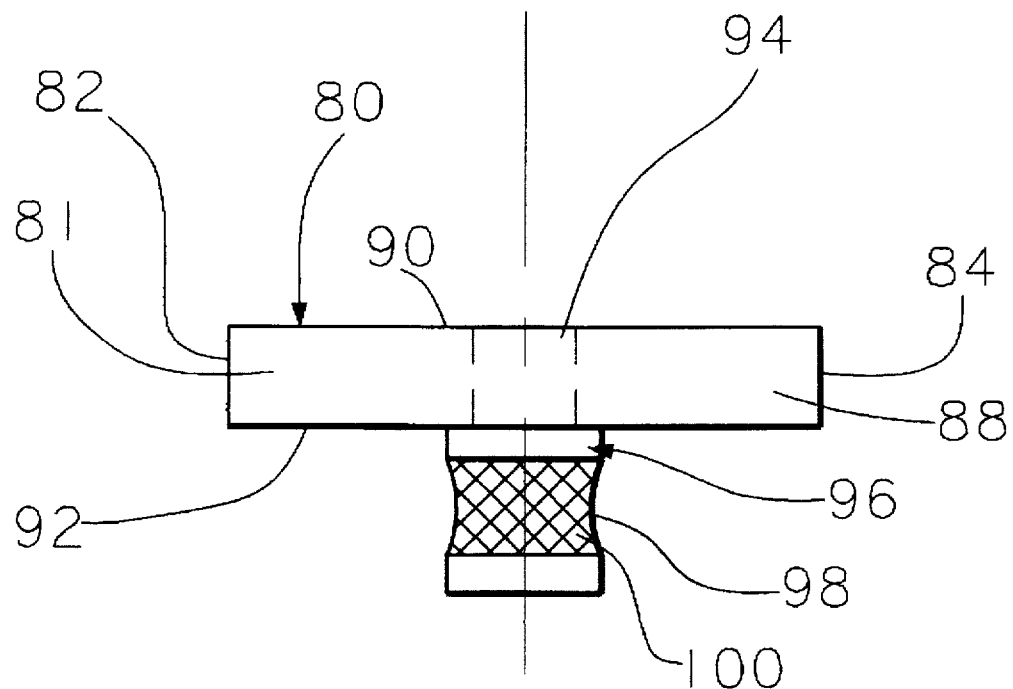

In using the tool 80, a slender yieldable object whose length dimension is many times greater than its cross-sectional dimension such as a wire 102 or a rod 102 may be positioned, see FIG. 12, with the wire rod 102 in front of the left guide 96 and in back of the right guide 96. The wire 102 is in the recesses 98 of the guides 96 and in contact with the guides 96. If the tool 80 is rotated and the right guide 96 is moved away from the observer, the wire or rod 102 will be bent.

Figure 14:
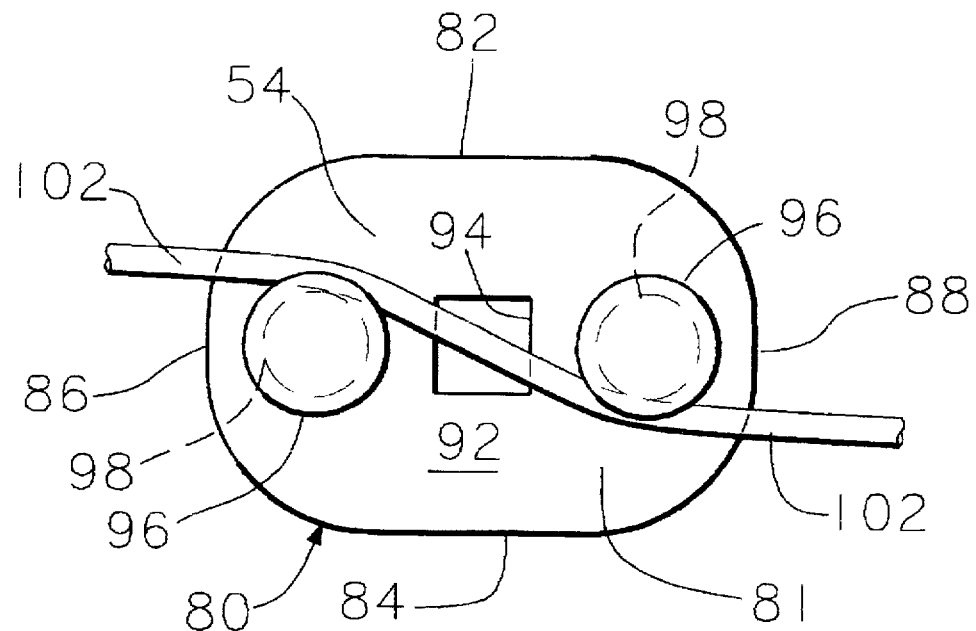

With respect to FIG. 14, if the tool 80 is rotated in a clockwise manner, the wire or rod 102 will be bent. In FIG. 14 it is seen that the wire or rod 102 is positioned in the recess 98 of each of the guides 96.

Figure 15:
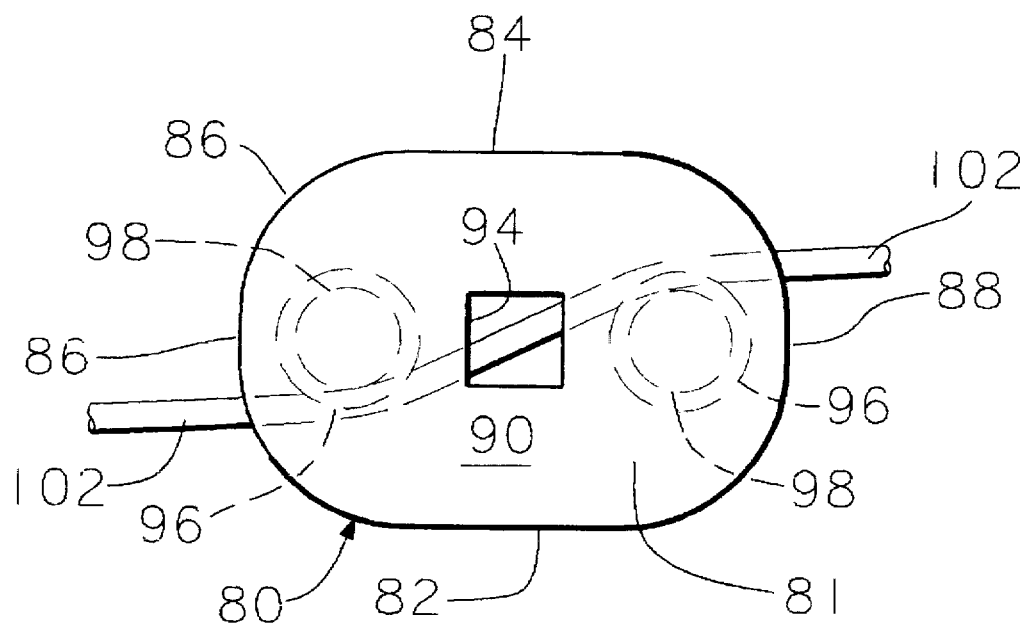

In FIG. 15, a top plan view, it is seen that if the tool 80 is rotated in a clockwise direction that the wire or rod 102 will be bent.

The tool 80 is a unitary one-piece continuous member. The tool 80 can be manufactured from a block of material with the excess material removed to leave the base 81 comprising the sides 82 and 84 and the ends 86 and 88 and the two spaced-apart guides 96 with recesses 98.

With the tool 80, there is less time expended in manufacturing this tool as compared with the tools 10 and 40.

The tools 10 and 40 comprise a separate base and two guides. With the tools 10 and 40, two spaced-apart holes are drilled in the base. Each of these holes receives a guide.

With the tool 10, in addition to fabricating the tool from the base and guides, there is a socket for receiving a stud from a drive stud or a ratchet wrench.

The guide 30 has a recess 34. The guide 96 has a recess 98. The recesses 34 and 98 can have roughened surfaces such as a knurled surface or a surface which has been sandblasted. I sandblasted a recessed area 98 to form a rough surface. The wire 102 was better positioned by the rough surface of the guide 98 than with a guide 98 having a smooth surface. This shows the value of a rough surface in the recessed area of the guide.

In certain instances it is desirable to sandblast the entire tool.

As contrasted with tools 10 and 40, the tool 80 is manufactured from a block of material such as aircraft aluminum. The excess material is removed or milled from the block of material or billet to leave the base and the two spaced-apart guides.

Instead of manufacturing the tool from a block of material, a die may be made. Then molten metal may be poured into the die to form a cast one-piece continuous unitary tool. Molten metal may be poured into the die to form the cast tool.

The result is a strong and small tool of unitary construction wherein the guides and the base are continuous. The tool 80 is small enough to fit in the palm of the hand of an electrician.

The tool depicted in the photographs and capable of being held in the palm of a person's hand has a base less than 3 inches in length; less than about 2 inches in width; and less than 1 inch in thickness. The base is substantially coplanar.

The guides have a length less than about 1.0 inch; a thickness less than about 0.9 inch; and a recessed thickness less than about 0.8 inch.

The distance from the outside of said base to the outside of said guides being less than about 2.25 inches.

The following paragraphs are a synopsis of what applicant regards as his invention and is the subject matter upon which the claims are based.

A tool for working a slender yieldable object whose length dimension is many times greater than its cross-sectional dimension comprising a base; said base being substantially coplanar as it is many times longer than it is thick and wider than it is thick; said base having a first surface and a second surface; said first surface and said second surface being opposed; a first means operatively connecting with said first surface for receiving a drive stud; two spaced-apart guides operatively connecting with said second surface; and the central part of said guides being recessed for receiving and for positioning and receiving said slender yieldable object to be worked by said tool.

A tool for working a slender yieldable object whose length dimension is many times greater than its cross-sectional dimension comprising a base; said base being substantially coplanar as it is many times longer than it is thick and wider than it is thick; said base having a first surface and a second surface; said first surface and said second surface being opposed; a first means operatively connecting with said first surface for receiving a drive stud; two spaced-apart guides operatively connecting with said second surface; the central part of said guides being recessed for receiving and for positioning and receiving said slender yieldable object to be worked by said tool; said base having a thickness less than about 1 inch, a length less than about 3 inches, a width less than about 2 inches; said guides having a maximum thickness less than about 0.9 inches, a recessed thickness of about 0.8 inches, and a length less than about 1.0 inch; and the distance from the outside of said base to the outside of said guides being less than 2.25 inches.

A tool for working a slender yieldable object whose length dimension is many times greater than its cross-sectional dimension comprising a base; said base being substantially coplanar as it is many times longer than it is thick and wider than it is thick; said base having a first surface and a second surface; said first surface and said second surface being opposed; a first means operatively connecting with said first surface for receiving a drive stud; two spaced-apart guides operatively connecting with said second surface; the central part of said guides being recessed for receiving and for positioning and receiving said slender yieldable object to be worked by said tool; said base and said guides being unitary and one continuous piece of material; said base comprising two spaced-apart parallel sides connected by curved ends; said first surface and said second surface being substantially parallel; and said first means being a recess for receiving said drive stud for moving said tool.

A tool for working a slender yieldable object whose length dimension is many times greater than its cross-sectional dimension comprising a base; said base being substantially coplanar as it is many times longer than it is thick and wider than it is thick; said base having a first surface and a second surface; said first surface and said second surface being opposed; a first means operatively connecting with said first surface for receiving a drive stud; two spaced-apart guides operatively connecting with said second surface; the central part of said guides being recessed for receiving and for positioning and receiving said slender yieldable object to be worked by said tool; said base having a thickness less than about 1 inch, a length less than about 3 inches, a width less than about 2 inches; said guides having a maximum thickness less than about 0.9 inches, a recessed thickness of about 0.8 inches, and a length less than about 1.0 inch; and the distance from the outside of said base to the outside of said guides being less than 2.25 inches said base and said guides being unitary and one continuous piece of material; said base comprising two spaced-apart parallel sides connected by curved ends; the central part of at least one of said guides having a roughened surface to assist in working said slender yieldable object; said first surface and said second surface being substantially parallel; and said first means being a recess for receiving said drive stud for moving said tool.

A process for making a tool for working a slender yieldable object whose length dimension is many times greater than its cross-sectional dimension, said process comprising forming a substantially coplanar base which has a length many times its thickness and which is wider than it is thick; forming said base to have a first surface and a second surface with said surfaces being opposed; operatively connecting a first means with said first surface for receiving a drive stud; operatively connecting two spaced-apart guides with said second surface; and recessing the central part of said guides for receiving and for positioning said long slender yieldable object to be worked by said tool.

A process for making a tool for working a slender yieldable object whose length dimension is many times greater than its cross-sectional dimension, said process comprising forming a substantially coplanar base which has a length many times its thickness and which is wider than it is thick; forming said base to have a first surface and a second surface with said surfaces being opposed; operatively connecting a first means with said first surface for receiving a drive stud; operatively connecting two spaced-apart guides with said second surface; recessing the central part of said guides for receiving and for positioning said long slender yieldable object to be worked by said tool; forming said tool to have a thickness less than about 1 inch, a length less than about 3 inches, and a width less than about 2 inches; forming said guides to have a maximum thickness less than about 0.9 inches, a recessed thickness less than about 0.8 inches, and a length less than about 1.0 inches; and forming said tool to have the distance from the outside of said base to the outside of said guides to be less than about 2.25 inches.

A process for making a tool for working a slender yieldable object whose length dimension is many times greater than its cross-sectional dimension, said process comprising forming a substantially coplanar base which has a length many times its thickness and which is wider than it is thick; forming said base to have a first surface and a second surface with said surfaces being opposed; operatively connecting a first means with said first surface for receiving a drive stud; operatively connecting two spaced-apart guides with said second surface; recessing the central part of said guides for receiving and for positioning said long slender yieldable object to be worked by said tool; forming said tool from a single piece of material to form said base having said first surface and said second surface and said base being continuous and unitary with said two spaced-apart guides; forming said base to have two spaced-apart parallel sides connected by curved ends; forming said first surface and said second surface to be substantially parallel; and forming said first means to be a recess for receiving said drive stud for moving said tool.

A process for making a tool for working a slender yieldable object whose length dimension is many times greater than its cross-sectional dimension, said process comprising forming a substantially coplanar base which has a length many times its thickness and which is wider than it is thick; forming said base to have a first surface and a second surface with said surfaces being opposed; operatively connecting a first means with said first surface for receiving a drive stud; operatively connecting two spaced-apart guides with said second surface; recessing the central part of said guides for receiving and for positioning said long slender yieldable object to be worked by said tool; forming said tool to have a thickness less than about 1 inch, a length less than about 3 inches, and a width less than about 2 inches; forming said guides to have a maximum thickness less than about 0.9 inches, a recessed thickness less than about 0.8 inches, and a length less than about 1.0 inches; forming said tool to have the distance from the outside of said base to the outside of said guides to be less than about 2.25 inches forming said tool from a single piece of material to form said base having said first surface and said second surface and said base being continuous and unitary with said two spaced-apart guides; forming said base to have two spaced-apart parallel sides connected by curved ends; forming said first surface and said second surface to be substantially parallel; and forming said first means to be a recess for receiving said drive stud for moving said tool.

A process for making a tool for working a slender yieldable object whose length dimension is many times greater than its cross-sectional dimension, said process comprising forming a substantially coplanar base which has a length many times its thickness and which is wider than it is thick; forming said base to have a first surface and a second surface with said surfaces being opposed; operatively connecting a first means with said first surface for receiving a drive stud; operatively connecting two spaced-apart guides with said second surface; recessing the central part of said guides for receiving and for positioning said long slender yieldable object to be worked by said tool; forming said tool from a single piece of material to form said base having said first surface and said second surface and said base being continuous and unitary with said two spaced-apart guides; forming said base to have two spaced-apart parallel sides connected by curved ends; forming said first surface and said second surface to be substantially parallel; forming said first means to be a recess for receiving said drive stud for moving said tool; forming as said first means a recess in said base for receiving said drive stud for working said tool; forming said recess by drilling a hole in said base and then removing excess base material around said hole to form said recess for receiving said drive stud; and forming a roughened surface on at least one of said guides to assist in working said slender yieldable object.

A tool for working a slender yieldable object whose length dimension is many times greater than its cross-sectional dimension and made by a process comprising forming a substantially coplanar base which has a length many times its thickness and which is wider than it is thick; forming said base to have said first surface and said second surface with said surfaces being opposed; operatively connecting a first means with said first surface for receiving a drive stud; operatively connecting two spaced-apart guides with said second surface; and recessing the central part of said guides for receiving and for positioning said long slender yieldable object to be worked by said tool.

A tool for working a slender yieldable object whose length dimension is many times greater than its cross-sectional dimension and made by a process comprising forming a substantially coplanar base which has a length many times its thickness and which is wider than it is thick; forming said base to have said first surface and said second surface with said surfaces being opposed; operatively connecting a first means with said first surface for receiving a drive stud; operatively connecting two spaced-apart guides with said second surface; recessing the central part of said guides for receiving and for positioning said long slender yieldable object to be worked by said tool; forming said tool to have a thickness less than about 1 inch, a length less than about 3 inches, and a width less than about 2 inches; forming said guides to have a maximum thickness less than about 0.9 inches, a recessed thickness less than about 0.8 inches, and a length less than about 1.0 inches; forming said tool to have the distance from the outside of said base to the outside of said guides to be less than about 2.25 inches; forming as said first means a recess in said base for receiving said drive stud for moving said tool; forming said recess by drilling a hole in said base and then removing excess base material around said hole to form said recess for receiving said drive stud; and forming a roughened surface on at least one of said guides to assist in working said slender yieldable object.

A tool for working a slender yieldable object whose length dimension is many times greater than its cross-sectional dimension and made by a process comprising forming a substantially coplanar base which has a length many times its thickness and which is wider than it is thick; forming said base to have said first surface and said second surface with said surfaces being opposed; operatively connecting a first means with said first surface for receiving a drive stud; operatively connecting two spaced-apart guides with said second surface; recessing the central part of said guides for receiving and for positioning said long slender yieldable object to be worked by said tool; forming said tool to have a thickness less than about 1 inch, a length less than about 3 inches, and a width less than about 2 inches; forming said guides to have a maximum thickness less than about 0.9 inches, a recessed thickness less than about 0.8 inches, and a length less than about 1.0 inches; forming said tool to have the distance from the outside of said base to the outside of said guides to be less than about 2.25 inches; forming as said first means a recess in said base for receiving said drive stud for moving said tool; forming said recess by drilling a hole in said base and then removing excess base material around said hole and removing said excess material to form said recess for receiving said drive stud; and forming a roughened surface on at least one of said guides to assist in working said slender yieldable object.

A combination of a tool and a long slender yieldable object whose length dimension is many times greater than its cross-sectional dimension and comprising a base; said base being substantially coplanar as it is many times longer than it is thick and wider than it is thick; said base having a first surface and a second surface; said first surface and said second surface being opposed; a first means operatively connecting with said first surface for receiving a drive stud; two spaced-apart guides operatively connecting with said second surface; the central part of said guides being recessed for receiving and for positioning and receiving said slender yieldable object to be worked by said tool; part of said object being between said guides and contacting said guides on said second surface; and a stud operatively connecting with said first means on said first surface for moving said tool and for bending said object.

A combination of a tool and a long slender yieldable object whose length dimension is many times greater than its cross-sectional dimension and comprising a base; said base being substantially coplanar as it is many times longer than it is thick and wider than it is thick; said base having a first surface and a second surface; said first surface and said second surface being opposed; a first means operatively connecting with said first surface for receiving a drive stud; two spaced-apart guides operatively connecting with said second surface; the central part of said guides being recessed for receiving and for positioning and receiving said slender yieldable object to be worked by said tool; part of said object being between said guides and contacting said guides on said second surface; and a stud operatively connecting with said first means on said first surface for moving said tool and for bending said object; said base and said guides being unitary and one continuous piece of material; said base comprising two spaced-apart parallel sides connected by curved ends; said first surface and said second surface being substantially parallel; and the central part of at least one of said guides having a roughened surface for working said slender yieldable object.

A combination of a tool and a long slender yieldable object whose length dimension is many times greater than its cross-sectional dimension and comprising a base; said base being substantially coplanar as it is many times longer than it is thick and wider than it is thick; said base having a first surface and a second surface; said first surface and said second surface being opposed; a first means operatively connecting with said first surface for receiving a drive stud; two spaced-apart guides operatively connecting with said second surface; the central part of said guides being recessed for receiving and for positioning and receiving said slender yieldable object to be worked by said tool; part of said object being between said guides and contacting said guides on said second surface; a stud operatively connecting with said first means on said first surface for moving said tool and for bending said object; said base having a thickness less than about 1 inch, a length less than about 3 inches, and a width less than about 2 inches; said studs having a maximum thickness less than about 0.9 inches, a recessed thickness of about 0.8 inches, and a length less than about 1.0 inch; the distance from the outside of said base to the outside of said guides being less than 2.25 inches; said base and said guides being unitary and one continuous piece of material; said base comprising two spaced-apart parallel sides connected by curved ends; said first surface and said second surface being substantially parallel; and the central part of at least one of said guides having a roughened surface for working said slender yieldable object.

A combination of a tool for bending a long slender yieldable object whose length dimension is many times greater than its cross-sectional dimension, said long slender yieldable object and a drive means for moving said tool and bending said object; said tool comprising; a base; said base being substantially coplanar as it is many times longer than it is thick and wider than it is thick; said base having a first surface and a second surface; said first surface and said second surface being opposed; a first means operatively connecting with said first surface for receiving a drive stud; two spaced-apart guides operatively connecting with said second surface; the central part of said guides being recessed for receiving and for positioning said object to be worked by said tool; said drive means comprising; a handle; a drive stud operatively connecting with said handle; said drive stud being in said first means for moving said tool; and part of said object being between said guides and contacting said guides on said second surface.

A combination of a tool for bending a long slender yieldable object whose length dimension is many times greater than its cross-sectional dimension, said long slender yieldable object and a drive means for moving said tool and bending said object; said tool comprising; a base; said base being substantially coplanar as it is many times longer than it is thick and wider than it is thick; said base having a first surface and a second surface; said first surface and said second surface being opposed; a first means operatively connecting with said first surface for receiving a drive stud; two spaced-apart guides operatively connecting with said second surface; the central part of said guides being recessed for receiving and for positioning said object to be worked by said tool; said drive means comprising; a handle; a drive stud operatively connecting with said handle; said drive stud being in said first means for moving said tool; part of said object being between said guides and contacting said guides on said second surface; said base and said guides being unitary and one continuous piece of material; said base comprising two spaced-apart parallel sides connected by curved ends; said first surface and said second surface being substantially parallel; and the central part of at least one of said guides having a roughened surface for working said slender yieldable object.

A combination of a tool for bending a long slender yieldable object whose length dimension is many times greater than its cross-sectional dimension, said long slender yieldable object and a drive means for moving said tool and bending said object; said tool comprising; a base; said base being substantially coplanar as it is many times longer than it is thick and wider than it is thick; said base having a first surface and a second surface; said first surface and said second surface being opposed; a first means operatively connecting with said first surface for receiving a drive stud; two spaced-apart guides operatively connecting with said second surface; the central part of said guides being recessed for receiving and for positioning said object to be worked by said tool; said drive means comprising; a handle; a drive stud operatively connecting with said handle; said drive stud being in said first means for moving said tool; part of said object being between said guides and contacting said guides on said second surface; said base having a thickness less than about 1 inch, a length less than about 3 inches, a width less than about 2 inches; said guides having a maximum thickness less than about 0.9 inches, a recessed thickness of about 0.8 inches, and a length less than about 1.0 inch; the distance from the outside of said base and the outside of said guides being less than 2.25 inches; said base and said guides being unitary and one continuous piece of material; said base comprising two spaced-apart parallel sides connected by curved ends; said first surface and said second surface being substantially parallel; and the central part of at least one of said guides having a roughened surface for working said slender yieldable object.

What I claim is:

1. A tool for working a slender yieldable object whose length dimension is many times greater than its cross-sectional dimension comprising:
   a. a base;
   b. said base being substantially coplanar as it is many times longer than it is thick and wider than it is thick;
   c. said base having a first surface and a second surface;
   d. said first surface and said second surface being opposed;
   e. a first means operatively connecting with said first surface for receiving a drive stud;
   f. two spaced-apart guides operatively connecting with said second surface; and
   g. the central part of said guides being recessed for receiving and for positioning and receiving said slender yieldable object to be worked by said tool.

2. A tool according to claim 1 and comprising:
   a. said base having a thickness less than about 1 inch, a length less than about 3 inches, a width less than about 2 inches;
   b. said guides having a maximum thickness less than about 0.9 inches, a recessed thickness of about 0.8 inches, and a length less than about 1.0 inch; and
   c. the distance from the outside of said base to the outside of said guides being less than 2.25 inches.

3. A tool according to claim 1 and comprising:
   a. said base and said guides being unitary and one continuous piece of material;
   b. said base comprising two spaced-apart parallel sides connected by curved ends;
   c. said first surface and said second surface being substantially parallel; and d. said first means being a recess for receiving said drive stud for moving said tool.

4. A tool according to claim 2 and comprising:
   a. said base and said guides being unitary and one continuous piece of material;
   b. said base comprising two spaced-apart parallel sides connected by curved ends;
   c. the central part of at least one of said guides having a roughened surface to assist in working said slender yieldable object;
   d. said first surface and said second surface being substantially parallel; and
   e. said first means being a recess for receiving said drive stud for moving said tool.

5. A process for making a tool for working a slender yieldable object whose length dimension is many times greater than its cross-sectional dimension, said process comprising:
   a. forming a substantially coplanar base which has a length many times its thickness and which is wider than it is thick;
   b. forming said base to have a first surface and a second surface with said surfaces being opposed;
   c. operatively connecting a first means with said first surface for receiving a drive stud;
   d. operatively connecting two spaced-apart guides with said second surface; and
   e. recessing the central part of said guides for receiving and for positioning said long slender yieldable object to be worked by said tool.

6. A process according to claim 5 and comprising:
   a. forming said tool to have a thickness less than about 1 inch, a length less than about 3 inches, and a width less than about 2 inches;
   b. forming said guides to have a maximum thickness less than about 0.9 inches, a recessed thickness less than about 0.8 inches, and a length less than about 1.0 inches; and
   c. forming said tool to have the distance from the outside of said base to the outside of said guides to be less than about 2.25 inches.

7. A process according to claim 5 and comprising:
   a. forming said tool from a single piece of material to form said base having said first surface and said second surface and said base being continuous and unitary with said two spaced-apart guides;
   b. forming said base to have two spaced-apart parallel sides connected by curved ends;
   c. forming said first surface and said second surface to be substantially parallel; and
   d. forming said first means to be a recess for receiving said drive stud for moving said tool.

8. A process according to claim 6 and comprising:
   a. forming said tool from a single piece of material to form said base having said first surface and said second surface and said base being continuous and unitary with said two spaced-apart guides;
   b. forming said base to have two spaced-apart parallel sides connected by curved ends;
   c. forming said first surface and said second surface to be substantially parallel; and
   d. forming said first means to be a recess for receiving said drive stud for moving said tool.

9. A process according to claim 7 and comprising:
   a. forming as said first means a recess in said base for receiving said drive stud for working said tool;
   b. forming said recess by drilling a hole in said base and then removing excess base material around said hole to form said recess for receiving said drive stud; and
   c. forming a roughened surface on at least one of said guides to assist in working said slender yieldable object.

10. A process according to claim 7 and comprising:
    a. forming a die to receive molten metal for making said tool;
    b. positioning said molten metal in said die;
    c. lowering the temperature of said molten metal to solidify sadi metal to form said tool; and
    d. separating said tool and said die to have said tool.

11. A tool for working a slender yieldable object whose length dimension is many times greater than its cross-sectional dimension and made by a process comprising:
    a. forming a substantially coplanar base which has a length many times its thickness and which is wider than it is thick;
    b. forming said base to have said first surface and said second surface with said surfaces being opposed;
    c. operatively connecting a first means with said first surface for receiving a drive stud;
    d. operatively connecting two spaced-apart guides with said second surface; and
    e. recessing the central part of said guides for receiving and for positioning said long slender yieldable object to be worked by said tool.

12. A tool made by a process according to claim 11 and comprising:
    a. forming said tool to have a thickness less than about 1 inch, a length less than about 3 inches, and a width less than about 2 inches;
    b. forming said guides to have a maximum thickness less than about 0.9 inches, a recessed thickness less than about 0.8 inches, and a length less than about 1.0 inches; and
    c. forming said tool to have the distance from the outside of said base to the outside of said guides to be less than about 2.25 inches.

13. A tool made by a process according to claim 11 and comprising:
    a. forming said tool from a single piece of material to form said base having said first surface and said second surface and said base being continuous and unitary with said two spaced-apart guides;
    b. forming said base to have two spaced-apart parallel sides connected by curved ends;
    c. forming said first surface and said second surface to be substantially parallel; and
    d. forming said first means to be a recess for receiving said drive stud for moving said tool.

14. A tool made by a process according to claim 12 and comprising:
    a. forming as said first means a recess in said base for receiving said drive stud for moving said tool;
    b. forming said recess by drilling a hole in said base and then removing excess base material around said hole to form said recess for receiving said drive stud; and
    c. forming a roughened surface on at least one of said guides to assist in working said slender yieldable object.

15. A tool made by a process according to claim 13 and comprising:
 a. forming a die to receive molten metal for making said tool;
 b. positioning said molten metal in said die;
 c. lowering the temperature of said molten metal to solidify sadi metal to form said tool; and
 d. separating said tool and said die to have said tool.

16. A combination of a tool and a long slender yieldable object whose length dimension is many times greater than its cross-sectional dimension and comprising:
 a. a base;
 b. said base being substantially coplanar as it is many times longer than it is thick and wider than it is thick;
 c. said base having a first surface and a second surface;
 d. said first surface and said second surface being opposed;
 e. a first means operatively connecting with said first surface for receiving a drive stud;
 f. two spaced-apart guides operatively connecting with said second surface;
 g. the central part of said guides being recessed for receiving and for positioning and receiving said slender yieldable object to be worked by said tool;
 h. part of said object being between said guides and contacting said guides on said second surface; and
 i. a stud operatively connecting with said first means on said first surface for moving said tool and for bending said object.

17. A combination according to claim 16 and comprising:
 a. said base having a thickness less than about 1 inch, a length less than about 3 inches, and a width less than about 2 inches;
 b. said studs having a maximum thickness less than about 0.9 inches, a recessed thickness of about 0.8 inches, and a length less than about 1.0 inch; and
 c. the distance from the outside of said base to the outside of said guides being less than 2.25 inches.

18. A combination according to claim 16 and comprising:
 a. said base and said guides being unitary and one continuous piece of material;
 b. said base comprising two spaced-apart parallel sides connected by curved ends;
 c. said first surface and said second surface being substantially parallel; and
 d. the central part of at least one of said guides having a roughened surface for working said slender yieldable object.

19. A combination according to claim 17 and comprising:
 a. said base and said guides being unitary and one continuous piece of material;
 b. said base comprising two spaced-apart parallel sides connected by curved ends;
 c. said first surface and said second surface being substantially parallel; and
 d. the central part of at least one of said guides having a roughened surface for working said slender yieldable object.

20. A combination of a tool for bending a long slender yieldable object whose length dimension is many times greater than its cross-sectional dimension, said long slender yieldable object and a drive means for moving said tool and bending said object: said tool comprising:
 a. a base;
 b. said base being substantially coplanar as it is many times longer than it is thick and wider than it is thick;
 c. said base having a first surface and a second surface;
 d. said first surface and said second surface being opposed;
 e. a first means operatively connecting with said first surface for receiving a drive stud;
 f. two spaced-apart guides operatively connecting with said second surface;
 g. the central part of said guides being recessed for receiving and for positioning said object to be worked by said tool;

said drive means comprising:
 h. a handle;
 i. a drive stud operatively connecting with said handle;
 j. said drive stud being in said first means for moving said tool; and
 k. part of said object being between said guides and contacting said guides on said second surface.

21. A combination according to claim 20 and comprising:
 a. said base having a thickness less than about 1 inch, a length less than about 3 inches, a width less than about 2 inches;
 b. said guides having a maximum thickness less than about 0.9 inches, a recessed thickness of about 0.8 inches, and a length less than about 1.0 inch; and
 c. the distance from the outside of said base and the outside of said guides being less than 2.25 inches.

22. A combination according to claim 20 and comprising:
 a. said base and said guides being unitary and one continuous piece of material;
 b. said base comprising two spaced-apart parallel sides connected by curved ends;
 c. said first surface and said second surface being substantially parallel; and
 d. the central part of at least one of said guides having a roughened surface for working said slender yieldable object.

23. A combination according to claim 21 and comprising:
 a. said base and said guides being unitary and one continuous piece of material;
 b. said base comprising two spaced-apart parallel sides connected by curved ends;
 c. said first surface and said second surface being substantially parallel; and
 d. the central part of at least one of said guides having a roughened surface for working said slender yieldable object.

* * * * *